United States Patent
Batabyal et al.

(10) Patent No.: US 9,778,924 B2
(45) Date of Patent: Oct. 3, 2017

(54) PLATFORM FOR ENABLING CREATION AND USE OF AN API FOR A SPECIFIC SOLUTION

(71) Applicant: Wipro Limited, Bangalore (IN)

(72) Inventors: Ritwik Batabyal, Bangalore (IN); Santosh Nallapeta, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 139 days.

(21) Appl. No.: 14/296,465

(22) Filed: Jun. 5, 2014

(65) Prior Publication Data
US 2014/0366000 A1    Dec. 11, 2014

(51) Int. Cl.
G06F 9/44         (2006.01)
G06F 9/45         (2006.01)
G06F 9/445        (2006.01)

(52) U.S. Cl.
CPC . *G06F 8/61* (2013.01); *G06F 8/30* (2013.01)

(58) Field of Classification Search
CPC .......... G06F 8/30; G06F 17/2705; G06F 8/20; G06F 8/38; G06F 8/427
See application file for complete search history.

(56) References Cited

U.S. PATENT DOCUMENTS

| | | | | |
|---|---|---|---|---|
| 7,020,882 B1 * | 3/2006 | Lewallen | ............... | G06F 9/4445 717/106 |
| 7,721,278 B2 * | 5/2010 | Alam | .................. | G06F 9/44521 717/131 |
| 8,943,483 B2 * | 1/2015 | Balasubramanian | ..... | G06F 8/20 717/140 |
| 9,077,773 B2 * | 7/2015 | Marietti | .................. | H04L 65/40 |
| 2004/0233236 A1 * | 11/2004 | Yang | .......................... | G06F 8/30 715/763 |
| 2005/0071801 A1 * | 3/2005 | Jesse | ......................... | G06F 8/34 717/100 |
| 2007/0234285 A1 * | 10/2007 | Mendoza | .................. | G06F 8/51 717/114 |
| 2011/0029949 A1 * | 2/2011 | Adams | ...................... | G06F 8/36 717/109 |
| 2011/0247016 A1 * | 10/2011 | Seong | ..................... | G06F 8/447 719/328 |

(Continued)

OTHER PUBLICATIONS

Shreyas Cholia et al.; The NEWT Platform an Extensible Plugin Framework for Creating ReSTful HPC APIs; 2014 IEEE; pp. 17-20; <http://dl.acm.org/citation.cfm?id=2690892&CFID=708700505&CFTOKEN=74432287>.*

(Continued)

*Primary Examiner* — Thuy Dao
*Assistant Examiner* — Cuong V Luu
(74) *Attorney, Agent, or Firm* — Finnegan, Henderson, Farabow, Garrett & Dunner, LLP (57) ABSTRACT

The embodiments herein relate to creating solutions for a platform and, more particularly, to enabling a user to create an API (Application Programming Interface) for a platform and enabling at least one other user to use a created API for his platform. Embodiments herein disclose a system which complies with component-based and service-oriented concepts of API architecture, and by providing next generation tools and libraries for open-standards based multi-channel application development by automated generation of APIs and interactive consumption of the APIs via one single portal.

26 Claims, 6 Drawing Sheets

(56) References Cited

U.S. PATENT DOCUMENTS

| | | | | |
|---|---|---|---|---|
| 2012/0124562 A1* | 5/2012 | Balasubramanian | ... | G06F 8/434 717/140 |
| 2013/0132584 A1* | 5/2013 | Palladino | ................ | H04L 65/40 709/226 |
| 2014/0137090 A1* | 5/2014 | Whitcomb | ................ | G06F 8/47 717/163 |
| 2014/0366000 A1* | 12/2014 | Batabyal | ................... | G06F 8/61 717/120 |

OTHER PUBLICATIONS

Andres Gonzalez et al.; Platform-Independent Accessibility API Accessible Document Object Model; 2005 ACM; pp. 63-71; <http://dl.acm.org/citation.cfm?id=1061824&CFID=708700505&CFTOKEN=74432287>.*

Joshua Bloch; How to Design a Good API and Why it Matters; 2006 ACM; pp. 506-507; <http://dl.acm.org/citation.cfm?id=1176622>.*

Jeffrey C. Mogul et al.; Orphal API Design Challenges for Open Router Platforms on Proprietary Hardware; 2008 HP; 9 pages; <https://pdfs.semanticscholar.org/42b6/5de908d16d5203c4a2a66d8e46bd6938e3bb.pdf>.*

Jeffrey Stylos et al.; A Case Study of API Redesign for Improved Usability; 2008 IEEE; pp. 189-192; <http://ieeexplore.ieee.org/stamp/stamp.jsp?arnumber=4639083>.*

Jeffrey Stylos et al.; Mapping the Space of API Design Decisions; 2007 IEEE; pp. 50-57; <http://ieeexplore.ieee.org/stamp/stamp.jsp?arnumber=4351326>.*

Ying Zhu; Introducing Google Chart Tools and Google Maps API in Data Visualization Courses; 2012 IEEE; pp. 6-9; <http://ieeexplore.ieee.org/stamp/stamp.jsp?arnumber=6353424>.*

Michi Henning; API Design Matters; 2009 ACM; pp. 46-56; <http://dl.acm.org/citation.cfm?id=1506424>.*

* cited by examiner

PLATFORM FOR ENABLING CREATION AND USE OF AN API FOR A SPECIFIC SOLUTION

TECHNICAL FIELD

The embodiments herein relate to creating solutions for a platform and, more particularly, to enabling a user to create an API (Application Programming Interface) for an application on a platform and enabling at least one other user to use a created API for his application on same or different platform.

BACKGROUND

Currently, most organizations have a plurality of software platforms/solutions/applications, which are used for their internal activities or external activities. Internal activities may comprise of project management, time management, payroll management, leave policies and so on. External activities may comprise of client interactions, client servicing, business channel specific consumer interactions and so on. The organizations may also have a plurality of types of devices that may access their applications/platforms/solutions (either by their employees, clients, users and so on), wherein the devices may be at least one of a tablet, a computer, a laptop, a smart phone and so on. The devices may be using a plurality of Operating Systems (OS) such as Windows (8, 7, XP and so on), MacOS, Linux (Ubuntu, RedHat and so on), Android, IOS, Windows Mobile, BlackBerry and so on. These software applications/platforms/solutions have to interact with each other and enable users with any type of device to use these applications/platforms/solutions to enable smooth and business relevant operations in the organization.

An API (Application Programming Interface) may be used to enable the various software applications/platforms/solutions to interact with each other. The APIs may also be used to enable the applications/platforms/solutions to interact with devices, irrespective of the type of device and OS (provided that an API has been provisioned to enable a device running an OS to access the platform/service). Creation of an API may comprise of a plurality of steps such as integration of backend functionalities, transformational exercise (from back end to front end) and device compliance. These steps require a large effort on part of the organization and the involved employees. The initial effort may be in terms of finding the right people to implement these steps in a suitable manner. Further effort may be in terms of time and a large code footprint generated. There are development environments which enable users to develop APIs in an integrated fashion. The APIs are created without much of an underlying plan, and thus the design of the system using the API is cobbled together based on short term gains.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for generation and consumption of APIs (Application Programming Interfaces), using a single portal. Referring now to the drawings, and more particularly to FIGS. 1 through 6, where similar reference characters denote corresponding features consistently throughout the figures, there are shown embodiments.

Figure 1:
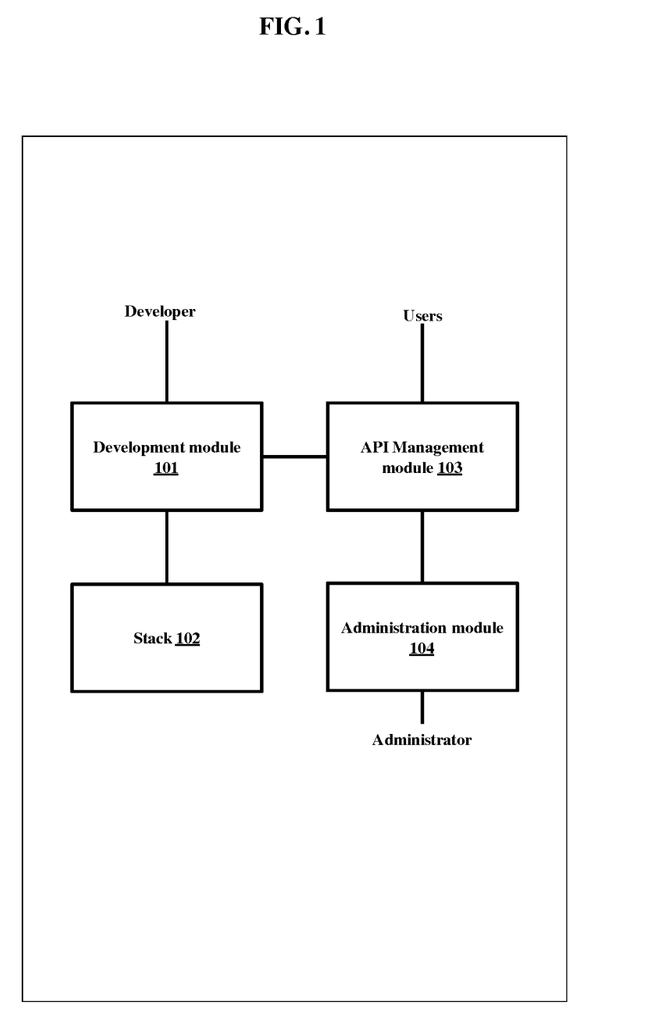
FIG. 1 depicts a system for API generation and consumption, according to embodiment disclosed herein.

FIG. 1 depicts a system for API generation and consumption, according to embodiment disclosed herein. The system comprises of a development module 101, a stack 102 (which may be implemented in a cloud, wherein the cloud may provide a computing platform and a solution stack as a service (such as a public cloud, private cloud, PaaS (Platform as a Service), IaaS (Infrastructure as a Service) and so on)), an API management module 103 and an administration module 104. The development module 101 may enable at least one developer to generate APIs. The developer may be a person who is authorized to generate an API. The developer may be authorized to generate the APIs by an authorized person and/or entity, herein after referred to as an administrator using the administration module 104.

The development module 101 enables the developer to select a target functional packaging (wherein the developer wants to develop an API for the target functional packaging and the targeted functional packaging being based on at least one of identified business and technology functions which may be turned into APIs). The development module 101 may enable the developer to select a target functional packaging from at least one of a source code or a binary code. The development module 101 may generate APIs from enterprise functionalities in various technologies using a real-time, rule-based parsing algorithm, based on the provided target functional packaging. The development module 101 may parse packages, components and functions related to the API. The development module 101 may further identify and enable the API. The development module 101 may further identify the API automatically. The development module 101 may further identify and enable the API based on at least one input from the developer. The development module 101 may generate the API as content, wherein at least one metadata and/or at least one tag may be associated with the API. The development module 101 may add metadata and tags automatically. In an embodiment herein, the development module 101 may seek a confirmation from the developer for automatically generated metadata and tags, wherein the developer may be provided with an option to edit the metadata and tags. The development module 101 may enable the developer to provide the metadata and tags. The development module 101 further associates documentation to the API. The documentation may comprise of policies associated with the API, nomenclature used by the API, parameters related to the API, fine tuning of the API (if done), testing of the API (if performed) and so on. The documentation may be provided by the developer. The documentation may also be provided by the administrator. The development module 101 further provides the generated API to the API management module 103.

The API management module 103 may further harden the APIs. The API management module 103 may perform the hardening of the API based on governance policies, security-filters and rules, as provided by the stack 102. The API management module 103 may store the APIs in a suitable location in a suitable format. An example of the format in which the API may be stored is a REST (Representational state transfer) Service based URL (Uniform Resource Locator) contents with parameters of JSON (JavaScript Object Notation), XML (Extensible Markup Language) and so on.

In an embodiment herein, the API management module 103 may fetch publicly available APIs such as Google Maps, Amazon, Youtube, Twitter and so on based on at least one input from the developer. The API management module 103 may search publicly available databases in a continuous manner and may fetch APIs on discovering them. The development module 101 further associates documentation to the public APIs in the same manner as it does to Enterprise private APIs. The documentation may comprise of policies associated with the API, nomenclature used by the API, parameters related to the API, fine tuning of the API (if done), testing of the API (if performed) and so on. The documentation may be provided by the developer of the API. The documentation may also be provided by the administrator. The development module 101 further provides the documented API to the API management module 103. The API management module 103 may store the documented public APIs in a suitable location.

In an embodiment herein, the API management module 103 may fetch APIs which the API management module 103 has the requisite permissions to access. The API management module 103 may search available databases (such as databases in an organization) in a continuous manner and may fetch APIs on discovering them. The API management module 103 may be pointed to the location of an API by the administrator using the administration module 104. The API management module 103 may store the fetched APIs in a suitable location.

The administration module 104 may enable administration of the rules and policies. The administration module 104 may be a standalone module, which enables an administrator to configure and manage the rules of hardening along with generation of insights of API transactions. The administration module 104 may further ensure that various factors related to the API such as documentation and transaction Quality of Services with proper policies and compliances are satisfied. The administration module 104 may enable the administrator to verify tags and metadata associated with an API. The administration module 104 may enable the administrator to add, delete and/or modify tags and metadata associated with an API.

Consider a user who is in need of an API, wherein the user may have access to the API management module 103. The API management module 103 may enable the user to select a suitable API, wherein the user may select the API based on his requirements from a list of APIs provided by the API management module 103. The user may select from a list of APIs provided by the API management module 103. The user may also search the APIs accessible to the API management module 103 (the accessible APIs may comprise of publicly available APIs stored by the API management module 103, publicly available APIs which may not be fetched/stored by the API management module 103, APIs accessible to the API management module 103, APIs generated and stored by developers and so on) based on a parameter, service, industry, fields present in the API and so on. The API management module 103 may provide results based on the presence of the parameter in the API or data associated with the API (such as metadata, tags, documentation and so on). The list of APIs may comprise of publicly available APIs stored by the API management module 103, publicly available APIs which may not be fetched/stored by the API management module 103, APIs accessible to the API management module 103, APIs generated and stored by developers and so on. For example, consider a user developing a front end for a technology. On the user designing the front end based on the target device and OS (Operating System), the user selects an API from the list of APIs available at the API management module 103 which the user believes suits his front end design. The API management module 103 may map the selected API and the requirements as received from the user. The mapping may be based on a plurality of parameters comprising of design parameters, input parameters, associated libraries and so on. If the API management module 103 is able to map the selected API and the requirements, the API management module 103 may provide the user with a build package in the format as required by the user. Examples of the format may be at least one of a customizable eclipse downloadable file, an iOS package, an android package and so on. If the API management module 103 is unable to map the selected API and the requirements, the API management module 103 may prompt the user to select another API.

The API management module 103 may be integrated with the development module 101, which may enable documentation of the APIs. The API management module 103 may include a means for collaboration amongst developers providing clarity on APIs, which are stored. The API management module 103 may include a means for collaboration amongst developers providing clarity on APIs, which are being accessed by a user in real time.

At least one of the modules as depicted herein may be co-located with each other. The modules as depicted herein may be located remotely from each other. The modules may use a suitable wireless and/or wired connection means to communicate with each other.

Figure 2:
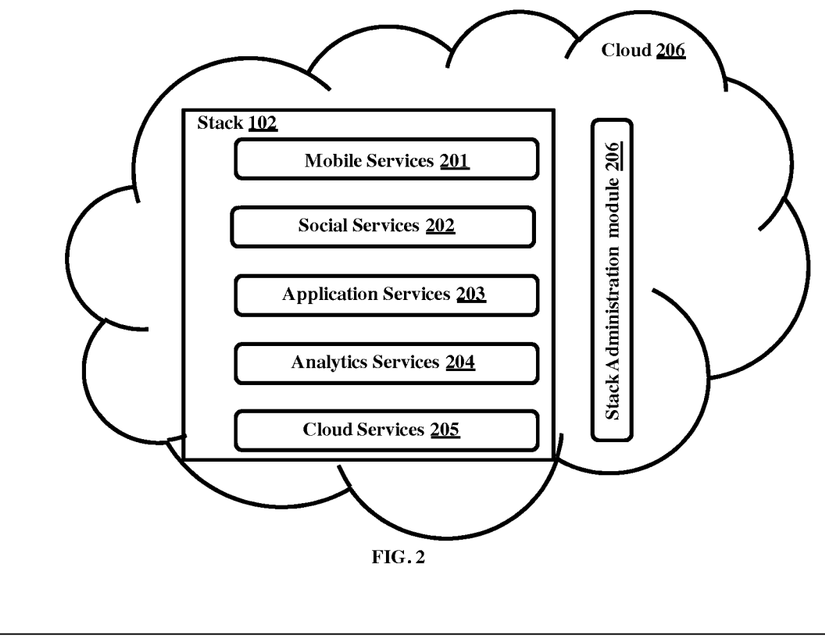
FIG. 2 illustrates the stack comprising of a plurality of integrated service orientations, according to embodiments disclosed herein.

FIG. 2 illustrates the stack comprising of a plurality of integrated service orientations, according to embodiments disclosed herein. The stack 102 may comprise of a plurality of integrated service orientations and interactive activity. The stack 102 may be configured by a stack administration module 206. The stack administration module 206 may provide a user interface for an authorized person and/or entity (hereinafter referred to as a stack administrator) to add/delete/modify the integrated service orientations and interactive activity.

The stack 102 may be based on service orientations and comprise of technology specific layers such as mobile services 201, social services 202, application services 203, analytics services 204 and cloud services 205, wherein the layers may enable rapid solution development. The stack 102 may further comprise of libraries which powers the business platform with API composition, orchestration which spans scalable information management, unified analytics, cloud management, mobile management, advanced web management and so on. The layers may provide abstractions to these technology usages with components providing ready integrations to products and frameworks that are ready with the compliance to design and construction standards, ready implementations of concepts in the particular technology space.

The mobile services layer 201 may comprise of components providing design compliant implementations of mobile applications (web, native, hybrid, and so on). The mobile services layer 201 may comprise of components providing event based communications to backend functions hosted on servers or enterprise systems. The mobile services layer 201 may act as a bridge between enterprise systems and a mobile application. In one embodiment, the mobile services layer 201 may provide components helping in multi-platform mobile application development and implementation of applications in concepts like face recognition, near field communication and so on.

The social services layer 202 may comprise of components which provide abstraction to social network integrations through open standards.

The application services layer 203 may provide infrastructure for rapid development of web-based and stand-alone applications. The application services layer 203 may provide ready compliance to standards like service-oriented architecture (SOA), established design patterns and Java Specification Requests (JSRs) and so on. The SOA standard may provide ready infrastructure components like security services and so on, which are internally configured into type of authentication such as lightweight directory access protocol (LDAP), file based, database based and so on) and the type of products to be integrated like Oracle database based authentication-security service and so on.

The analytics services layer 204 may comprise of an information capturing mechanism (mining), from multiple endpoints, based on event management and socket.io framework. The information mining may be done by integrating and orchestrating across market products is done through map reduce algorithms. The analytics services layer 204 may provide ready analytics on web, social, mobile, device based information metrics and so on. The cloud services layer 205 may have components with ready integration and orchestration abilities across cloud service providers.

Figure 3:
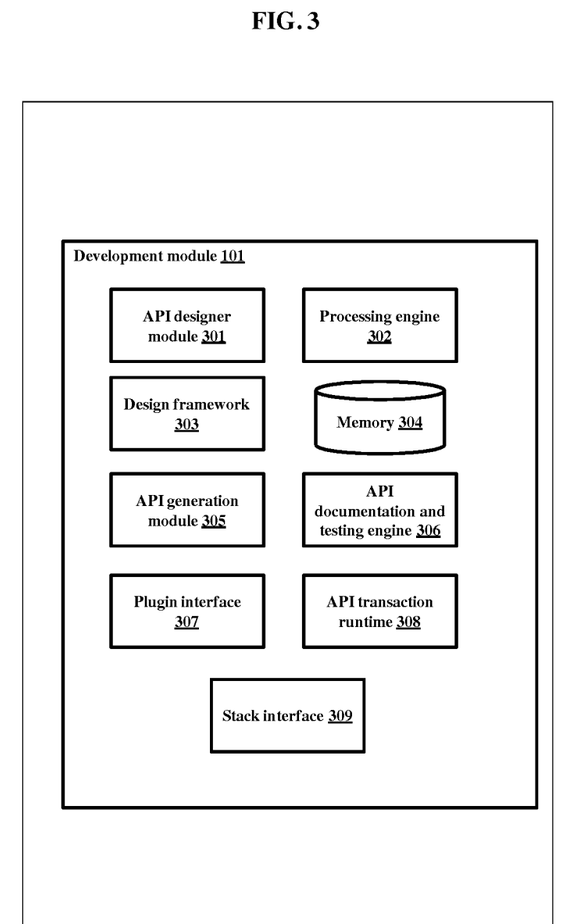
FIG. 3 depicts a development module which enables a developer to generate an API, according to embodiments disclosed herein.

FIG. 3 depicts a development module which enables a developer to generate an API, according to embodiments disclosed herein. The development module 101 comprises of an API designer module 301, a processing engine 302, a design framework 303, a memory 304, an API generation module 305, an API documentation and testing engine 306, a plugin interface 307, an API transaction runtime 308 and a stack interface 309. The API development module 101 may check if a developer is authorized, before providing the developer access to the module 101. The development module 101 may enable the developer to request for access, by enabling the developer to create a user name and associated verification credentials (such as a password, keyphrase, pin number and so on).

The API designer module 301 may offer the developer a wizard based interface for designing applications (hereinafter referred to as app). The interface may be a graphical user interface. The API designer module 301 may enable the developer to select an app-template from a storage location such as the memory 304, wherein the processing engine 302 may fetch the templates from the memory 304 and make the template available to the developer through the API designer module 301. The API designer module 301 may provide plug-ins for IDEs (Integrated Development Environment) like Eclipse and XCode editor and so on to the. The API designer module 301 may provide developers with complete integration with the consumable API development environments to further modify the designed apps. The API designer module 301 enables the developer to create new projects using a project creation wizard with boilerplate project creation options for mobile, web, native and so on. The API designer module 301 may also provide the developer with a choice of app development frameworks/libraries, device compliances with versions, complete build and deploy management abilities with configurations. The design framework 303 may provide script libraries to the API designer module 301, wherein the developer may select at least one script library. The processing engine 302 may verify the templates, frameworks, script libraries and so on, which have to be provided to the API designer module 301. The API designer module 301 may map APIs from the API management module 103 to app-widgets and create a project with relevant pre-configurations and assets. The memory 304 may comprise of information about mapping, front end design elements, real estate templates and so on. The API transaction runtime 308 may be used for technology based executions and communications like a mobile to backend server communication based on event driven architecture. The stack interface 309 enables the development module 101 to interact and exchange information with the stack 102.

The API generation module 305 enables the developer to select a target functional packaging (wherein the developer wants to develop an API for the target functional packaging and the targeted functional packaging being based on at least one of identified business and technology functions which may be turned into APIs). The API generation module 305 may enable the developer to select a target functional packaging from at least one of a source code or a binary code. The API generation module 305 may generate APIs from enterprise functionalities in various technologies using a real-time, rule-based parsing algorithm, based on the provided target functional packaging. The development module 101 may parse packages, components and functions related to the API. The API generation module 305 may further identify and enable the API. The API generation module 305 may further identify the API automatically. The API generation module 305 may further identify and enable the API based on at least one input from the developer. The API generation module 305 may generate the API as content, wherein at least one metadata and/or at least one tag may be associated with the API. The API generation module 305 may generate metadata and tags automatically. In an embodiment herein, the API generation module 305 may seek a confirmation from the developer for automatically generated metadata and tags, wherein the developer may be provided with an option to edit the metadata and tags. The API generation module 305 may enable the developer to provide the metadata and tags.

The API documentation and testing engine 306 further associates documentation to the API. The documentation may comprise of policies associated with the API, nomenclature used by the API, parameters related to the API, fine tuning of the API (if done), testing of the API (if performed) and so on. The documentation may be provided by the developer. The documentation may also be provided by the administrator.

Figure 4:
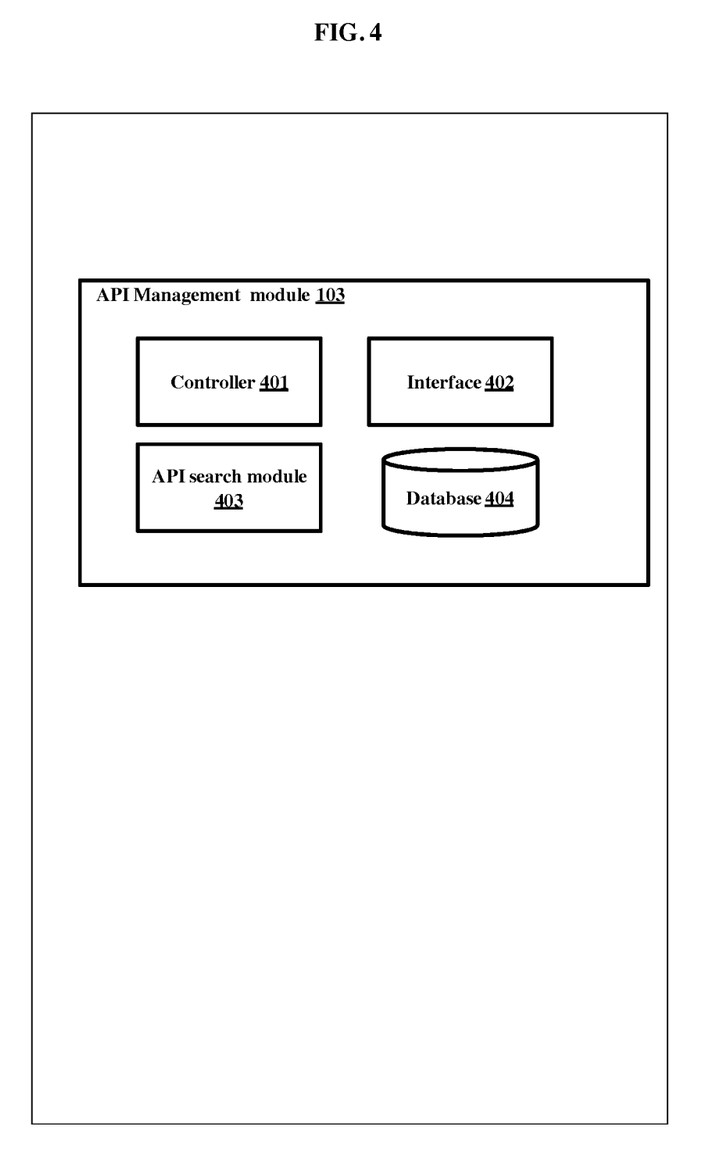
FIG. 4 illustrates the API management module, according to embodiments as disclosed herein.

FIG. 4 illustrates the API management module, according to embodiments as disclosed herein. The API management module 103 comprises of a controller 401, an interface 402, API search module 403 and a database 404.

The interface 402 enables an external entity, such as a user, an administrator and so on to connect to the API management module 103. The interface 402 may enable an administrator to enable administration of the rules and policies, wherein the interface 402 may connect to the administration module 104. The interface 402 may be a standalone module, which enables an administrator to configure and manage the rules of hardening along with generation of insights of API transactions. The interface 402 may further ensure that various factors related to the API such as documentation and transaction Quality of Services with proper policies and compliances are satisfied. The interface 402 may enable the administrator to verify tags and metadata associated with an API. The interface 402 may enable the administrator to add, delete and/or modify tags and metadata associated with an API.

On receiving the APIs from the development module 101, the controller 401 may harden the APIs. The controller 401 may perform the hardening of the API based on governance policies, security-filters and rules, as provided by the stack 102. The controller 401 may store the APIs in a suitable location in a suitable format such as the database 404. An example of the format in which the API may be stored is REST (Representational state transfer) Service based URL (Uniform Resource Locator)-contents with parameters of JSON (JavaScript Object Notation), XML (Extensible Markup Language) and so on.

In an embodiment herein, the API search module 403 may fetch publicly available APIs such as Google Maps, Amazon, Youtube, Twitter and so on. The API search module 403 may search publicly available databases in a continuous manner and may fetch APIs on discovering them. The API search module 403 may be pointed to the location of an API by the administrator using the administration module 104 and the interface 402. The controller 401 may store the fetched APIs in a suitable location such as the database 404.

In an embodiment herein, the API search module 403 may fetch APIs which the API management module 103 has the requisite permissions to access. The API search module 403 may search available databases (such as databases in an organization) in a continuous manner and may fetch APIs on discovering them. The API search module 403 may be pointed to the location of an API by the administrator using the administration module 104 and the interface 402. The controller 401 may store the fetched APIs in a suitable location.

The interface 402 may enable the user to access the API management module 103. The interface 402 may enable the user to select a suitable API, wherein the user may select the API based on his requirements from a list of APIs provided by the controller 401. The controller 401 may fetch the APIs from the database 404 and at least one other source. The controller 401 may enable the user to select from a list of APIs presented to him using the interface 402. The controller 401 may enable the user to perform a search for APIs accessible to the API management module 103. The controller may present the user with a list of APIs that may match his search parameters, wherein the user may select an API from the provided list of APIs. The list of APIs may comprise of publicly available APIs stored by the API management module 103, publicly available APIs which may not be fetched/stored by the API management module 103, APIs accessible to the API management module 103, APIs generated and stored by developers and so on. On the user selecting an API, the controller 401 may map the selected API and the requirements as received from the user. The mapping may be based on a plurality of parameters comprising of design parameters, input parameters, associated libraries and so on. If the controller 401 is able to map the selected API and the requirements, the controller 401 may provide the user with a build package in the format as required by the user. Examples of the format may be at least one of a customizable eclipse downloadable file, an iOS package, an android package and so on. If the controller 401 is unable to map the selected API and the requirements, the controller 401 may prompt the user to select another API using the interface 402.

In an embodiment herein, the user may select more than one API. The controller 401 may perform mapping for all the selected APIs and present the mapping results to the user ranked on how close the matching between the selected APIs and the requirements of the user. The user may select an API which maps the closest. The controller 401 may also select an API that maps the closest, without any input from the user.

The controller 401 may enable integration with the development module 101, which may enable documentation of the APIs. The controller 401 may also enable collaboration amongst developers providing clarity on APIs, which are stored. The controller 401 may also enable collaboration amongst developers providing clarity on APIs, which are being accessed by a user in real time.

Figure 5:
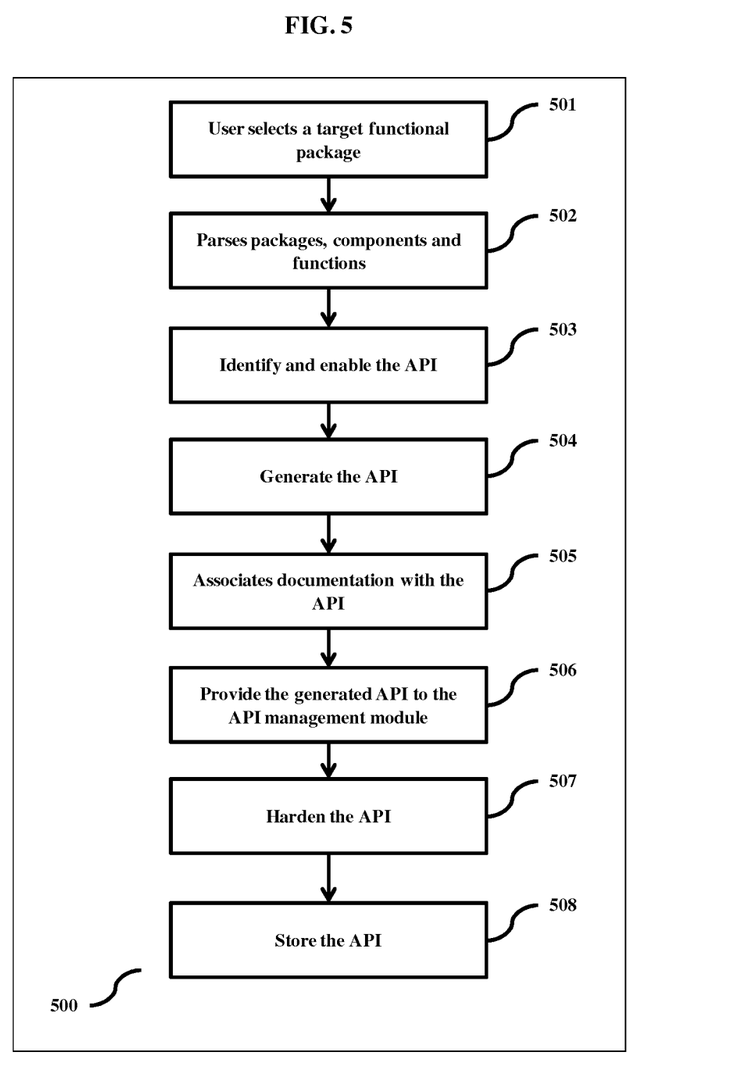
FIG. 5 is flowchart illustrating the process of a developer creating an API, according to embodiments as disclosed herein.

FIG. 5 is flowchart illustrating the process of a developer creating an API, according to embodiments as disclosed herein. The user selects (501) a target functional packaging. The developer may select the target functional packaging from at least one of a source code or a binary code. The development module 101 parses (502) packages, components and functions related to the API from the provided source and/or binary code. The development module 101 further identifies and enables (503) the API. The development module 101 may further identify the API automatically. The development module 101 may further identify and enable the API based on at least one input from the developer. The development module 101 generates (504) the API as content, wherein at least one metadata and/or at least one tag may be associated with the API. The development module 101 may add metadata and tags automatically. In an embodiment herein, the development module 101 may seek a confirmation from the developer for automatically generated metadata and tags, wherein the developer may be provided with an option to edit the metadata and tags. The developer may provide the metadata and tags. The development module 101 further associates (505) documentation to the API. The development module 101 further provides (506) the generated API to the API management module 103. The API management module 103 further hardens (507) the APIs. The API management module 103 may perform the hardening of the API based on governance policies, security-filters and rules, as provided by the stack 102. The API management module 103 stores (508) the APIs in a suitable location in a suitable format. The various actions in method 500 may be performed in the order presented, in a different order or simultaneously. Further, in some embodiments, some actions listed in FIG. 5 may be omitted.

Figure 6:
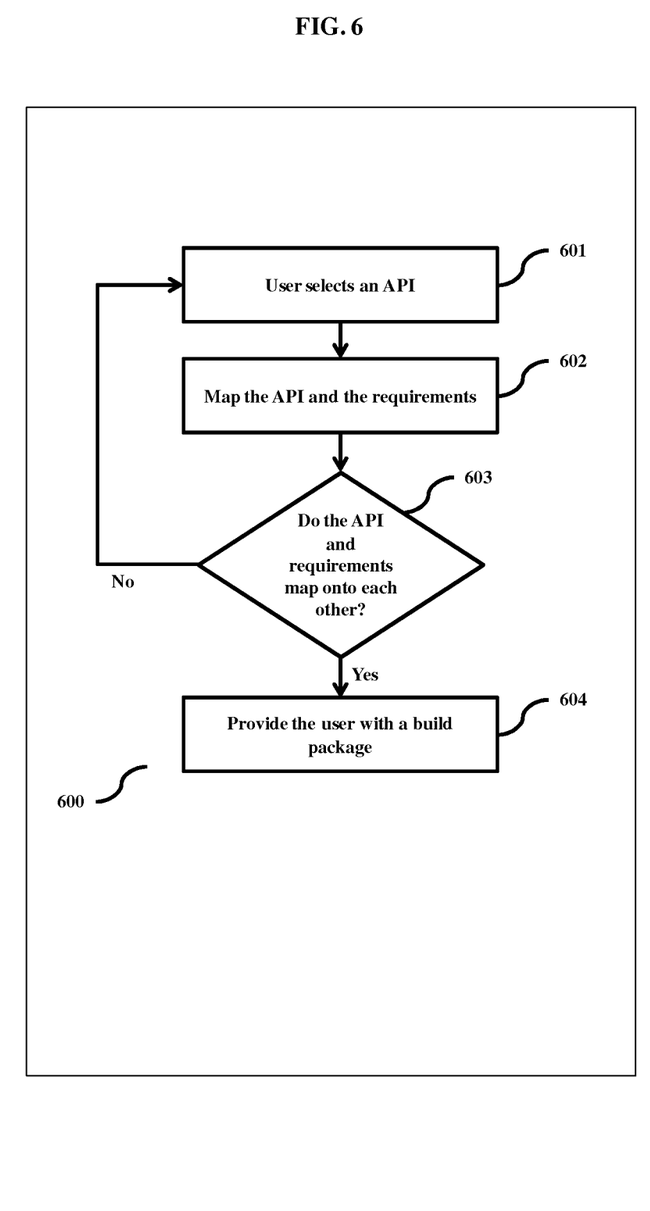
FIG. 6 is flowchart illustrating the process of a user creating an app by choosing and selecting APIs, according to embodiments as disclosed herein.

FIG. 6 is flowchart illustrating the process of a user creating an app, according to embodiments as disclosed herein. Consider a user who is creating and designing this app is in need of an API, wherein the user may have access to the API management module 103. The user selects (601) a suitable API, wherein the user may select the API based on his requirements from a list of APIs provided by the API management module 103. The list of APIs may comprise of publicly available APIs stored by the API management module 103, publicly available APIs which may not be fetched/stored by the API management module 103, APIs accessible to the API management module 103, APIs generated and stored by developers and so on. The requirements may be based on the application, as developed by the user. The API management module 103 maps (602) the selected API and the requirements as received from the user. The mapping may be based on a plurality of parameters comprising of design parameters, input parameters, associated libraries and so on. If the API management module 103 is able to map (603) the selected API and the requirements, the API management module 103 provides (604) the user with a build package in the format as required by the user. Examples of the format may be at least one of a customizable eclipse downloadable file, an iOS package, an android package and so on. If the API management module 103 is unable to map the selected API and the requirements, the API management module 103 may prompt the user to select another API. The various actions in method 600 may be performed in the order presented, in a different order or simultaneously. Further, in some embodiments, some actions listed in FIG. 6 may be omitted.

Embodiments herein disclose a system which complies with component-based and service-oriented concepts of API architecture, and by providing next generation tools and libraries for open-standards based multi-channel application development by automated generation of APIs and interactive consumption of the APIs via one single portal.

Embodiments herein disclose a system which keeps the development team isolated from the need for learning new technologies of application execution platforms by way of automated generation of application programming interfaces (API's) of enterprise business functions, which will significantly improve the productivity of overall project delivery.

Embodiments disclosed herein keep a user desiring to develop and API isolated from the need for learning new technologies of application execution platforms by way of automated generation of APIs, which will significantly improve the productivity of overall project delivery. Embodiments disclosed herein provide efficiency in setting up new project environments, builds and deployment. Embodiments disclosed herein help users to reuse APIs already existing, reducing the effort and schedule. Embodiments disclosed herein enable crowd source API development within and outside an enterprise which establishes a rich set of API pool within the enterprise.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for creating an API (Application Programming Interface), the method comprising:
receiving a selection of a target functional packaging, wherein the target functional packaging includes at least one of a source code and a binary code;
parsing the at least one of the source code and the binary code for the selected target functional packaging to determine at least one of: packages, components, and functions related to an API to be created;
generating a first API as content based on a result of the parsing;
associating the first API with at least one of metadata and a tag;
associating documentation with the first API;
associating, with the first API, one or more rules that govern access to one or more parameters of the first API; and
storing the first API in a database, wherein the first API is accessible in the database based on the at least one of: the metadata, the tag, and the documentation.

2. The method of claim 1, wherein the selection of the target functional packaging is based on the at least one of the source code and the binary code.

3. The method of claim 1, further comprising: generating the at least one of the metadata and the tag.

4. The method of claim 1, further comprising: receiving the at least one of the metadata and the tag.

5. The method of claim 1, wherein the documentation comprises at least one of: policies associated with the first API, nomenclature used by the first API, parameters related to the first API, fine tuning of the first API, and testing of the first API.

6. The method of claim 5, further comprising: receiving the documentation from at least one of: a developer and an administrator.

7. The method of claim 1, further comprising:
receiving, from a stack, information related to at least one of: governance policies, security filters, and security rules; and
updating, based on the information from the stack, the one or more rules that govern access to one or more parameters of the first API.

8. The method of claim 1, wherein the first API is stored as a REST (Representational state transfer) Service based URL (Uniform Resource Locator) content with parameters of at least one of: JSON (JavaScript Object Notation) and XML (Extensible Markup Language).

9. The method of claim 1, further comprising:
retrieving a second API from a second database, where in the second database is publicly accessible; and
providing one of the first or the second APIs.

10. A method of providing Application Programming Interface (API) for an application, the method comprising:
receiving information about an application to be associated with an API;
receiving a selection of a platform, from a plurality of platforms, on which the application is to be run;
displaying information associated with a plurality of APIs, wherein each of the plurality of APIs is provided for displaying based on at least one of: metadata, a tag, and documentation associated with the each of the plurality of APIs;

receiving a selection of one of the plurality of APIs;

determining whether a mapping relationship exists between the selected API and the application, wherein the mapping relationship includes a mapping of at least one of: input parameters and libraries;

if the mapping relationship exists between the selected API and the application:
  providing a build package based on the selected platform; and
  receiving a search query;

wherein the plurality of the each of the plurality of APIs is provided for displaying based on a relationship between the search query and the at least one of: metadata, a tag, and documentation associated with the each of the plurality of APIs.

11. The method of claim 10, wherein the plurality of APIs comprises at least one of: publicly available APIs, and APIs accessible to a predetermined group of users.

12. The method of claim 10, wherein the information about a platform is associated with a mobile device operating system.

13. A system for facilitating creation of an Application Programming Interface (API), the system comprising:
  a memory device storing a set of instructions; and
  a hardware processor configured to execute the set of instructions to:
    receive a selection of a target functional packaging, wherein the target functional packaging includes at least one of a source code and a binary code;
    parse the at least one of the source code and the binary code for the selected target functional packaging to determine at least one of: packages, components, and functions related to an API to be created;
    generate a first API as content based on a result of the parsing;
    associate the first API with at least one of metadata and a tag;
    associate documentation with the first API;
    associate, with the first API, one or more rules that govern access to one or more parameters of the first API; and
    store the first API in a database, wherein the first API is accessible in the database based on the at least one of: the metadata, the tag, and the documentation.

14. The system of claim 13, wherein the selection of the target functional packaging is based on the at least one of the source code and the binary code.

15. The system of claim 13, wherein the hardware processor is configured to execute the set of instructions to generate the at least one of the metadata and the tag.

16. The system of claim 13, wherein the hardware processor is configured to execute the set of instructions to receive the at least one of the metadata and the tag.

17. The system of claim 13, wherein the documentation comprises at least one of: policies associated with the first API, nomenclature used by the first API, parameters related to the first API, fine tuning of the first API, and testing of the first API.

18. The system of claim 17, wherein the hardware processor is configured to execute the set of instructions to receive the documentation from at least one of: a developer and an administrator.

19. The system of claim 13, wherein the hardware processor is configured to execute the set of instructions to:
  receive, from a stack, information related to at least one of: governance policies, security filters, and security rules; and
  update, based on the information received from the stack, the one or more rules that govern access to one or more parameters of the first API.

20. The system of claim 13, wherein the first API is stored as a REST (Representational state transfer) Service based URL (Uniform Resource Locator) content with parameters of at least one of: JSON (JavaScript Object Notation) and XML (Extensible Markup Language).

21. The system of claim 13, wherein the hardware processor is further configured to execute the set of instructions to:
  retrieve a second API from a second database, where in the second database is publicly accessible; and
  provide one of the first or the second APIs.

22. The system of claim 13, wherein the hardware processor is further configured to execute the set of instructions to provide an interface for receiving edits to at least one of: the one or more rules for accessing one or more parameters of the first API, and the at least one of the document, the metadata, and the tag associated with the first API.

23. A system for providing an Application Programming Interface (API) for an application, the system comprising:
  a memory device storing a set of instructions; and
  a hardware processor configured to execute the set of instructions to:
    receive information about an application to be associated with an API;
    receiving a selection of a platform, from a plurality of platforms, on which the application is to be run;
    display information associated with a plurality of APIs, wherein each of the plurality of APIs is provided for displaying based on at least one of: metadata, a tag, and documentation associated with the each of the plurality of APIs;
    receive a selection of one of the plurality of APIs;
    determine whether a mapping relationship exists between the selected API and the application, wherein the mapping relationship includes a mapping of at least one of: input parameters and libraries;
    if the mapping relationship exists between the selected API and the application: provide a build package based on the selected platform; and
    receive a search query;
  wherein the plurality of the each of the plurality of APIs is provided for displaying based on a relationship between the search query and the at least one of: metadata, a tag, and documentation associated with the each of the plurality of APIs.

24. The system of claim 23, wherein the plurality of APIs comprises at least one of: publicly available APIs, and APIs accessible to a predetermined group of users.

25. The system of claim 23, wherein the information about a platform is associated with a mobile device operating system.

26. The system of claim 23, wherein the hardware processor is further configured to execute the set of instructions to provide an interface for receiving edits to at least one of: one or more rules for accessing one or more parameters of the selected API, and at least one of the document, the metadata, and the tag associated with the selected API.

* * * * *

UNITED STATES PATENT AND TRADEMARK OFFICE
CERTIFICATE OF CORRECTION

PATENT NO. : 9,778,924 B2
APPLICATION NO. : 14/296465
DATED : October 3, 2017
INVENTOR(S) : Ritwik Batabyal It is certified that error appears in the above-identified patent and that said Letters Patent is hereby corrected as shown below:

In the Claims

Claim 9, Column 10, Lines 57-58, "where in the second database", should read -- wherein the second database --.

Claim 21, Column 12, Line 17, "from a second database, where in", should read -- from a second database wherein --.

Claim 23, Column 12, Line 33, "receiving a selection of a platform", should read -- receive a selection of a platform --.

Signed and Sealed this
First Day of May, 2018

Andrei Iancu
*Director of the United States Patent and Trademark Office*